(12) United States Patent
Shafer et al.

(10) Patent No.: US 7,302,618 B1
(45) Date of Patent: Nov. 27, 2007

(54) DIAGNOSIS OF NETWORK FAULT CONDITIONS

(75) Inventors: Philip A. Shafer, Raleigh, NC (US); Reid E. Wilson, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 11/511,015

(22) Filed: Aug. 28, 2006

Related U.S. Application Data

(63) Continuation of application No. 10/247,778, filed on Sep. 19, 2002, now Pat. No. 7,111,206.

(60) Provisional application No. 60/323,413, filed on Sep. 19, 2001.

(51) Int. Cl.
*G06F 11/00* (2006.01)

(52) U.S. Cl. .............. 714/48; 714/20; 714/49; 714/57

(58) Field of Classification Search .............. 714/20, 714/48, 49, 57
See application file for complete search history.

(56) References Cited

U.S. PATENT DOCUMENTS

| | | | |
|---|---|---|---|
| 5,011,405 A | 4/1991 | Lemchen | |
| 5,822,525 A | 10/1998 | Tafoya et al. | |
| 5,835,710 A | 11/1998 | Nagami et al. | |
| 5,937,393 A | 8/1999 | O'Leary et al. | |
| 5,964,844 A | 10/1999 | Rosenthal | |
| 6,108,701 A | 8/2000 | Davies et al. | |
| 6,167,446 A | 12/2000 | Lister et al. | |
| 6,212,559 B1 | 4/2001 | Bixler et al. | |
| 6,225,999 B1 | 5/2001 | Jain et al. | |
| 6,279,038 B1 | 8/2001 | Hogan et al. | |
| 6,282,575 B1 | 8/2001 | Lin et al. | |
| 6,335,919 B1 | 1/2002 | Maegawa | |
| 6,393,415 B1 | 5/2002 | Getchius et al. | |
| 6,434,543 B1 | 8/2002 | Goldberg et al. | |
| 6,438,594 B1 | 8/2002 | Bowman-Amuah | |
| 6,446,110 B1 | 9/2002 | Lection et al. | |
| 6,466,971 B1 | 10/2002 | Humpleman et al. | |
| 6,510,434 B1 | 1/2003 | Anderson et al. | |
| 6,553,568 B1 | 4/2003 | Fijolek et al. | |
| 6,585,778 B1 | 7/2003 | Hind et al. | |

(Continued)

OTHER PUBLICATIONS

Murata, M., "XML Media Types," Jan. 2001, IBM Tokyo Research Lab, RFC 3023, pp. 1-37.

(Continued)

*Primary Examiner*—Robert Beausoliel
*Assistant Examiner*—Joseph D Manoskey
(74) *Attorney, Agent, or Firm*—Shumaker & Sieffert, P.A.

(57) ABSTRACT

In general, the invention facilitates diagnosing fault conditions, such as flapping, by permitting users to request information for specific components in a network device such as a router. The invention also facilitates the diagnosis of other fault conditions, including, but not limited to, excessive numbers of dropped packets, hard drive crashes, high temperature readings, and inactive interface cards. A user may obtain a targeted log containing information relating to selected fault conditions or other network device events, rather than a system log containing information relating to all network device events, some of which may not be of interest to the user. The targeted log may be parsed and analyzed with greater ease than the system log.

13 Claims, 7 Drawing Sheets

U.S. PATENT DOCUMENTS

| | | | |
|---|---|---|---|
| 6,632,089 | B2 | 10/2003 | Rubbert et al. |
| 6,635,089 | B1 | 10/2003 | Burkett et al. |
| 6,640,241 | B1 | 10/2003 | Ozzie et al. |
| 6,654,793 | B1 | 11/2003 | Wollrath et al. |
| 6,671,869 | B2 | 12/2003 | Davidson et al. |
| 6,735,630 | B1 | 5/2004 | Gelvin et al. |
| 6,739,869 | B1 | 5/2004 | Taub et al. |
| 6,745,208 | B2 | 6/2004 | Berg et al. |
| 6,751,663 | B1 | 6/2004 | Farrell et al. |
| 6,766,368 | B1 | 7/2004 | Jakobson et al. |
| 6,914,551 | B2 | 7/2005 | Vidal |
| 6,915,330 | B2 | 7/2005 | Hardy et al. |
| 6,920,492 | B2 | 7/2005 | Richard |
| 6,944,659 | B2 | 9/2005 | Taggart et al. |
| 6,947,440 | B2 | 9/2005 | Chatterjee et al. |
| 6,976,090 | B2 | 12/2005 | Ben-Shaul et al. |
| 6,980,993 | B2 | 12/2005 | Horvitz et al. |
| 6,990,601 | B1 | 1/2006 | Tsuneya et al. |
| 7,010,593 | B2 | 3/2006 | Raymond |
| 7,054,901 | B2 | 5/2006 | Shafer |
| 7,058,558 | B2 | 6/2006 | Reichenthal |
| 7,072,946 | B2 | 7/2006 | Shafer |
| 7,111,206 | B1 | 9/2006 | Shafer et al. |
| 2001/0053947 | A1 | 12/2001 | Lenz et al. |
| 2002/0021713 | A1 | 2/2002 | Rezaie et al. |
| 2002/0059429 | A1 | 5/2002 | Carpenter et al. |
| 2002/0111972 | A1 | 8/2002 | Lynch et al. |
| 2002/0124061 | A1 | 9/2002 | Mossman |
| 2002/0143888 | A1 | 10/2002 | Lisiecki et al. |
| 2002/0147974 | A1 | 10/2002 | Wookey |
| 2002/0161852 | A1 | 10/2002 | Allen et al. |
| 2002/0161876 | A1 | 10/2002 | Raymond |
| 2002/0169794 | A1 | 11/2002 | Jones et al. |
| 2002/0178241 | A1 | 11/2002 | Eriksson |
| 2002/0178243 | A1 | 11/2002 | Collins |
| 2002/0184347 | A1 | 12/2002 | Olson et al. |
| 2003/0005090 | A1 | 1/2003 | Sullivan et al. |
| 2003/0028685 | A1 | 2/2003 | Smith et al. |
| 2003/0158947 | A1 | 8/2003 | Bloch et al. |
| 2004/0243929 | A1 | 12/2004 | Jones et al. |

OTHER PUBLICATIONS

Hollenbeck, S., "Guidelines for the use of extensible markup language (xml) within IETF Protocols," Jan. 2003, Verisign, Inc., RFC 3470, pp. 1-27.

Boyer, J., "XML-Signature Xpath Filter 2.0," Dec. 2003, PureEdge Solutions, RFC 3653, pp. 1-15.

U.S. Appl. No. 10/247,803, entitled "Identification of Applied Configuration Information," filed Sep. 19, 2002, Philip A. Shafer and Reid E. Wilson.

U.S. Appl. No. 11/301,435, entitled "Network Router Management Interface with Selective Rendering of Output," filed Dec. 13, 2005, Philip A. Shafer.

U.S. Appl. No. 11/511,015, entitled "Diagnosis of Network Fault Conditions," filed Aug. 28, 2006, Philip A. Shafer and Reid E. Wilson.

DIAGNOSIS OF NETWORK FAULT CONDITIONS

This application is a continuation of U.S. application Ser. No. 10/247,778, filed Sep. 19, 2002 now U.S. Pat. No. 7,111,206, which claims the benefit of U.S. Provisional Application Ser. No. 60/323,413, filed Sep. 19, 2001, the entire content of which is incorporated herein by reference.

TECHNICAL FIELD

The invention relates to computer networks and, more particularly, to fault diagnostics for computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain network devices, such as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Routers and other network devices can exhibit faults and fail to operate properly for various reasons, including, for example, environmental factors, network attacks, or component failures. When a router exhibits a fault, it can provide useful information, such as operational and configuration information, to a network administrator or other user. For instance, the router may store a system log that contains fault information that can assist the user in detecting faults. In many cases, however, the system log is difficult to parse, as it generally does not provide any prioritization or organization among various types of fault conditions. Rather, the system log is typically organized chronologically and can be somewhat random in the way in which it records fault information.

One fault condition of particular interest to a user is known as "flapping." Flapping occurs when a router enters a fault condition and exchanges information with peer routers that rely on it for routes after temporarily ceasing communication with them. When a router restarts after a fault condition, it exchanges large amounts of information with its peer routers. This information may include configuration and security information, as well as routing table information. Routing tables in large networks may take a long period of time to converge to stable routing information after a network fault due to temporary oscillations in the routing information.

These oscillations in routing information, i.e., changes that occur within the routing tables until they converge to reflect the current network topology, are often referred to as "flaps." These oscillations can cause significant problems, including intermittent loss of network connectivity as well as increased packet loss and latency. When flapping occurs, it is often informative to analyze communication between the routers, e.g., via the border gateway protocol (BGP), to determine which routers are causing the flapping and the conditions under which the flapping is occurring. Because the contents of the system log are not easily analyzed, however, the root cause of a flapping episode, and necessary remedial action, can be difficult to identify.

SUMMARY

In general, the invention facilitates diagnosis of fault conditions in a network device, such as a router, that can cause problems, such as flapping, by permitting users to request information for specific components in a router. The invention also facilitates the diagnosis of other fault conditions, including, but not limited to, excessive numbers of dropped packets, hard drive crashes, high temperature readings, and inactive interface cards. Instead of cumbersome analysis of a system log, the invention enables a user to diagnose fault conditions more efficiently. Users can obtain specific information on a more targeted basis by requesting specific information about individual network device components.

Certain embodiments of the invention may involve using XML tags to formulate requests for information relating to router events, such as fault conditions, and returning only the requested information, rather than the entire system log of all network device events. The XML requests may originate at a remote management client that communicates with the router via a command line interface (CLI). The XML requests may be handled by a management server module within the network device that transmits the requests to particular network device components based on an XML schema. The network device forwards XML replies from the modules to the management client, e.g., as a stream of XML tags. The management client then renders the XML tags to produce a fault condition report.

In some implementations, the information obtained in response to the request can be used to determine whether additional information relating to other network device components should be obtained. For example, a fault condition or some other indication provided by a network device component may suggest the possibility of fault conditions with other components. A rule base may be applied in order to obtain enough information to make an accurate diagnosis. The rule base may drive collection of a chain of different informational items until sufficient information is available to make a fault diagnosis with confidence. In particular, an initial set of XML requests and XML replies may be followed by additional XML requests in an effort to isolate a problem in the network device. The rule base may be consulted by a human user or automatically by a fault diagnosis script.

One embodiment is directed to a router-implemented method that includes receiving information relating to network device events and identifying at least some of the network device events that meet one or more user-specified criteria. The information relating to these events is presented.

In another embodiment, a request for information relating to one or more network device events that satisfy selection criteria is generated. The request uses extensible markup language tags to specify the selection criteria. The requested information is extracted from a system log that contains information relating to a plurality of network device events and is presented to a user.

Another embodiment is directed to a network device including a system module to present information relating to network device events. A diagnosis module identifies at least a subset of the network device events that meets at least one user-specified criterion. A client interface module presents information relating to the identified events.

Still another embodiment is directed to a network device that includes a diagnosis module to generate a request for information relating to one or more network device events that satisfy selection criteria. The request specifies the selection criteria using extensible markup language tags. The diagnosis module extracts the requested information from a system log containing information relating to a plurality of router events. A client interface module presents the requested information to a user.

In another embodiment, a method comprises receiving, with a client device, a diagnose command that specifies a selection criteria using extensible markup language tags. The method further comprises sending a request for information from the client device to a network device to retrieve a system log that contains information relating to a plurality of network device events for a plurality of different components of the network device. The method also comprises generating, with the client device, an abridged system log from the system log by extracting information from the system log based on the selection criteria, and presenting the abridged system log to a user with the client device.

In another embodiment, a client device comprises a client interface module that presents an interface supporting input by which a user initiates remote diagnostics of a network device, wherein the input includes at least one user-specified criterion. The client device also comprises a diagnosis module that, in response to the input, automatically formats one or more commands using extensible markup language tags. The diagnosis module sends the commands from the client device to the network device to retrieve a system log that contains information relating to a plurality of network device events for a plurality of different components of the network device. The diagnosis module extracts the information from the system log and produces an abridged system log for presentment to the user via the client interface module.

The invention may be capable of providing one or more advantages. For example, the invention may promote a more targeted and efficient diagnosis of fault conditions in a network device, such as a router. In particular, the invention may be used to query fault information for particular components. In this manner, fault diagnosis may proceed on a more targeted basis, enabling fault conditions to be identified and alleviated more quickly. In turn, accelerated fault detection and repair can provide enhanced performance and quality of service in a network device.

In addition, the invention may facilitate formulation of fault condition reports and other documentation containing diagnostic information in a more manageable way. For example, fault condition information output as XML replies can be rendered to produce web pages or other documents conveying the information, and may serve as the basis for notifications such as emails to advise network administrators or technical support of the existence or risk of fault conditions in a network device.

Other embodiments may be directed to processor-readable media, apparatuses, and systems for performing these methods. The details of one or more embodiments of the invention are set forth in the accompanying drawings and the description below. Other features, objects, and advantages of the invention will be apparent from the description and drawings, and from the claims.

DETAILED DESCRIPTION

Figure 1:
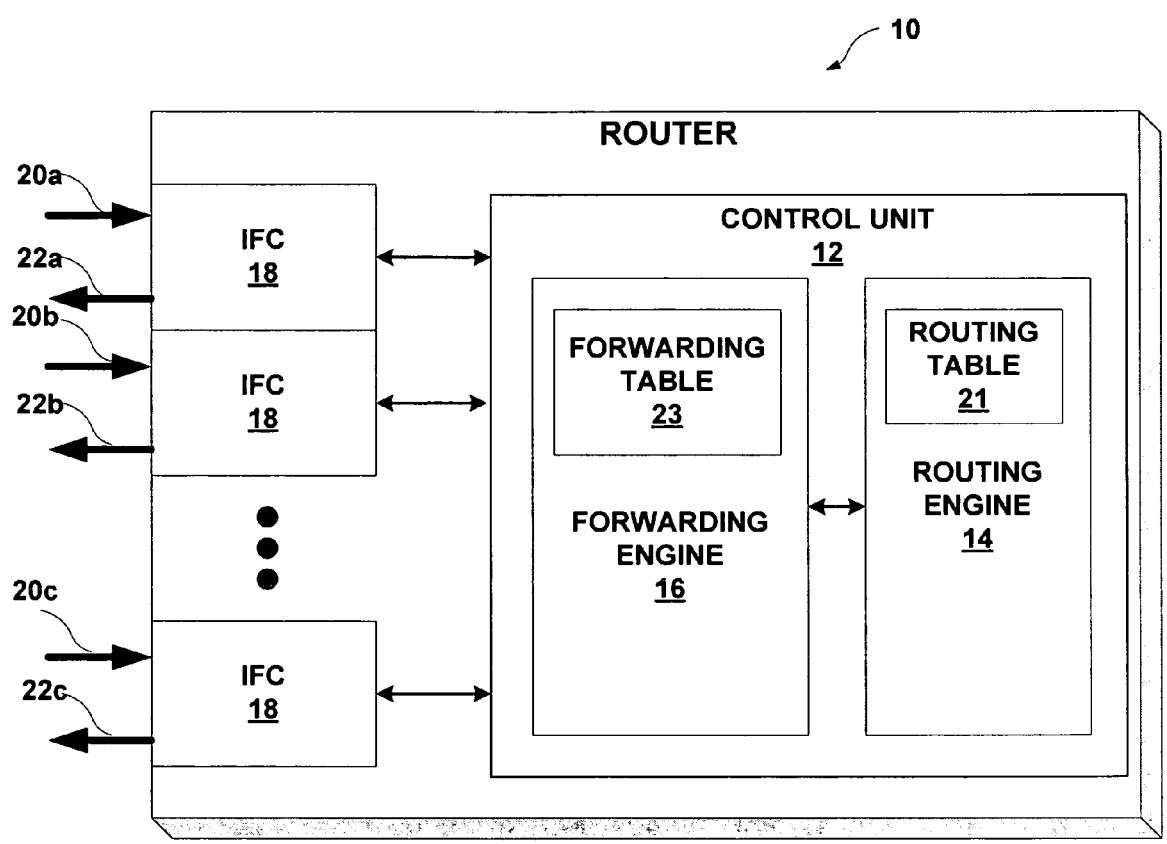
FIG. 1 is a block diagram illustrating an example network device in the form of a router.

In general, the invention facilitates diagnosis of flapping and other fault conditions by permitting users to request information for specific components in a network device. The terms "component," "module," or "resource" are used in an interchangeable manner herein to refer to functional or structural units within a network device that are capable of reporting diagnostic information, whether the information takes the form of detailed reports, parametric information, fault indications such as hard drive crashes, or merely measurements such as temperature and the like. When the network device receives a command to diagnose a condition, it may output a targeted set of information that is more specific to the diagnostic information requested. For example, a user may request diagnostic information for all components in the network device, or for specific components, such as the interfaces.

A management client, e.g., a router management client, may request diagnostic information by transmitting requests to the network device via a command line interface (CLI). The network device may be configured to present an XML Application Programming Interface (API), permitting the management client to transmit XML requests. A management server module residing on the network device maps the XML requests to particular router components, e.g., using an XML schema or Data Type Definition (DTD) file, and outputs a stream of XML tags to be parsed by the management client. Although described in reference to XML, other data description languages may readily be used. Other example languages include Extensible Style Language (XSL), Extensible Linking Language (XLL), Standardized Multimedia Authoring Language (SMIL), as well as variations of the Standard Generalized Markup Language (SGML).

By passing the XML document through an XLST (extensible stylesheet language transformation) process, the management client can discard elements that are not of interest to a network administrator associated with a particular management client. In addition, the management client can assign priorities to the remaining elements according to the design of the individual network or the preferences of the particular network service provider. The diagnostic results may be stored in a web page or database, facilitating comparison with recent diagnostic results retrieved from the same web page or database. In addition, the elements or changes can be sent by email to a notification mailing list to enable early intervention to alleviate network fault conditions.

Generation of XML requests by a management client via the CLI may be desirable to permit requests to be tailored to the particular information desired by given network service providers. Alternatively, a diagnostic module may be embedded in the network device and equipped to generate a standard set of XML requests, for handling by the management server module, in response to CLI commands transmitted by a management client. In this case, the management server module maps the XML requests to particular network device components. The diagnostic module then receives the XML tags from the management server module, and may render the tags for delivery to the management client to assemble the output into an XML document.

In some embodiments, a diagnosis module associated with the network device may analyze a system log containing information relating to all fault conditions that the router encounters. Based on the analysis, the diagnosis module may present the user with only the information of interest. In particular, the diagnosis module may be responsive to particular requests for information provided by a router management client. The diagnosis module automatically parses the content of the system log to produce an abridged system log containing information about fault conditions specifically requested by the router management client. The abridged system log is then transmitted to the management client. Compared to the relatively unorganized information contained in the full system log, the information that the diagnosis subsystem presents is significantly easier to analyze and use in diagnosing fault conditions.

In this discussion, various embodiments of the invention are described in the context of diagnosing "flapping," i.e., the repetitive exchange of security, configuration, and routing table information between routers following a network fault or event. The principles of the invention, however, are generally applicable to a variety of fault detection applications. For example, the techniques described herein can also be used to diagnose excessive numbers of dropped packets, hard drive crashes, high temperature readings, and inactive interface cards, as well as other fault conditions. Accordingly, the invention is not to be construed as limited to the diagnosis of particular fault conditions. Also, the invention will be described generally herein in the context of routers. However, other network devices such as switches, hubs, firewalls, gateways, and the like may benefit from incorporation of structure and functionality similar to that described herein.

FIG. 1 is a block diagram illustrating an example network router 10 appropriate for diagnosing fault conditions in accordance with the principles of the invention. Network router 10 receives and forwards data packets across a network. As shown in FIG. 1, router 10 includes a control unit 12 with a packet routing engine 14 and a packet forwarding engine 16. Router 10 also includes one or more interface cards (IFCS) 18 for receiving and sending data packets via network links 20 and 22, respectively. Control unit 12 routes inbound packets received from inbound link 20 to the appropriate outbound link 22. Control unit 12 routes packets according to routing information stored in routing table 21.

Routing engine 14 maintains and updates the routing information within routing table 21. Forwarding engine 16 analyzes the contents of routing table 21 prior to receiving packets and pre-selects routes to be used when forwarding packets. Forwarding engine 16 then stores the selected routes in forwarding table 23. Upon receiving an inbound packet, forwarding engine 16 examines information within the packet to identify the destination of the packet. Based on the destination, forwarding engine 16 selects an available route and forwards the packet to one of the IFCs 18. IFCs 18 may be configured according to one of several different network protocols.

When a fault condition occurs, control unit 12 updates a system log to record information related to the fault, such as the component or components in which the fault occurred, the status of the system at the time of the fault condition, and other relevant information. A user can then submit a request for this information to aid in diagnosing the fault condition, e.g., via a router management client communicating with the CLI. Control unit 12 returns the information specified in the request, e.g., fault information for all components or for specific components only, in varying levels of detail as requested by the user.

More particularly, control unit 12 may analyze the system log and return the requested information in a targeted log that is easier to parse and analyze than the full system log. Further, a script may be used to parse the targeted log in an automated manner and to automatically alert a network administrator under certain specified conditions, such as, for example, when the occurrence of a particular fault condition exceeds a particular threshold. Alternatively, individual components or software modules within router 10 may store fault-related information and present the information to control unit 12 upon request. In this case, some or all of the fault information may not be stored in a system log, but rather by individual components or software modules operating within router 10. For example, a router management client may transmit targeted queries, such as XML queries, to the router via a command line interface (CLI), as will be described, and obtain a stream of XML tags from the router conveying the desired fault information.

Figure 2:
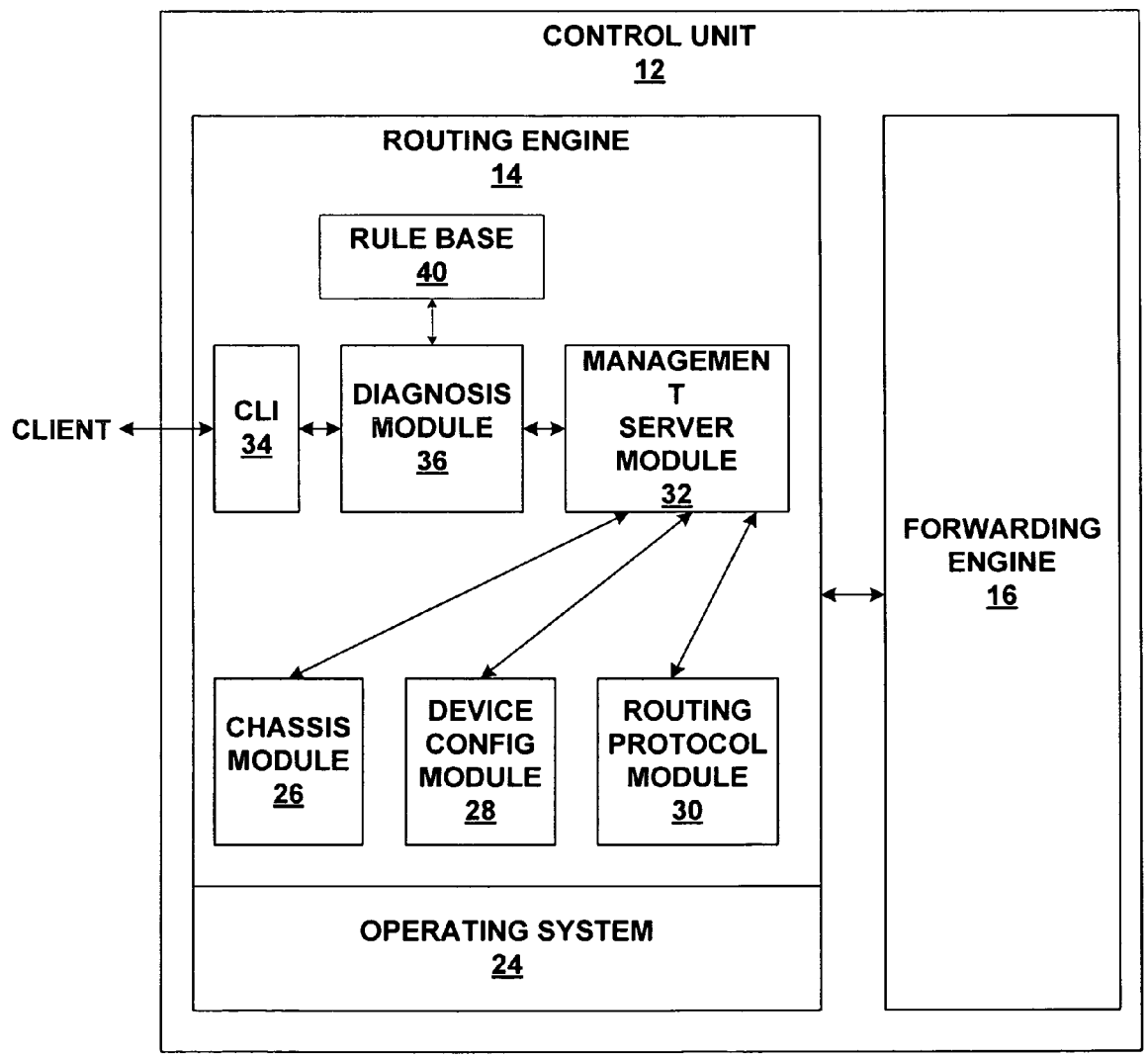
FIG. 2 is a block diagram illustrating an example control unit for a network router consistent with the principles of the invention.

FIG. 2 is a block diagram illustrating an example router control unit 12 consistent with the principles of the invention. In the example of FIG. 2, control unit 12 includes packet routing engine 14 and packet forwarding engine 16. Within control unit 12, routing engine 14 provides a management interface that interacts with a number of software modules running within an operating environment provided by operating system 24. Operating system 24 provides a multi-tasking operating system for execution of a number of concurrent processes. An example of such an operating system is FreeBSD, which is an advanced UNIX operating system that is compatible with a number of programmable processors (not shown), including processors commercially available from Intel Corporation.

As examples, routing engine 14 may include a chassis module 26, a device configuration module 28, and a routing protocol module 30 running as processes within the operating environment of operating system 24. A management server module 32 provides a user interface for interaction with system modules 26, 28, 30. Chassis module 24 defines an inventory and status of components installed in the chassis of network router 10, including IFCs 18. Device configuration module 28 defines and controls the physical configuration of network router 10. Routing protocol module 30 administers protocols supported by network router 10. For example, routing protocol module 30 may implement protocols for exchanging route information with other routing devices and for updating routing table 21 (shown in FIG. 1).

Management server module 32 communicates with one or more client interface modules running on routing engine 14. In the example of FIG. 2, management server module 32 communicates with a command line interface (CLI) module 34. Command line interface module 34 serves as a daemon process that listens for requests from network router clients. In some embodiments, CLI module 34 may give way to direct communication between router management clients and management server module 32, e.g., via script commands such as JUNOScript commands. The clients may take the form of human users such as system administrators or automated script applications. Initially, CLI module 34 listens for CLI commands, and passes them to management server module 32 for handling. The command line interface presented by control unit 12 can be dynamically replaced with an XML-based API upon receipt of a particular CLI command from a client. More specifically, management server module 32 receives incoming commands directly and services them based on the XML-based API.

XML is one example of an extensible markup language in the class encompassed by the Standard Generalized Markup Language (SGML) specification, and will be described herein for purposes of illustration. The official XML specification is governed by the World Wide Web Consortium and is available on the World Wide Web at http://www.w3.org/TR/REC-xml. The structure of the XML tags communicated via the XML API may be defined using Data Type Definition (DTD) files, XML Schema Language files, or other similar devices for XML tag definition. As an example, the XML tags may conform to the evolving JUNOScript™ API developed by Juniper Networks, Inc. of Sunnyvale, Calif. The JUNOScript™ API is described in JUNOScript™ API Guide and Reference, Version 4.4, available from Juniper Networks, Inc., the entire content of which is incorporated herein by reference.

In the example of FIG. 2, router control unit 12 may maintain a system log of diagnostic information recorded whenever the router encounters a fault condition. In operation, management server module 32 also may request fault information directly from the various router modules, which store the fault information using XML tags. This diagnostic information may include, for example, the type of fault condition encountered, the time at which the router encountered the fault condition, and the number of times the router encounters particular types of fault conditions. The information in this system log is recorded chronologically and is typically relatively disorganized and difficult to analyze or parse.

To facilitate analysis, a diagnosis module 36 may be provided to handle CLI commands that request diagnostic information for detecting fault conditions. Diagnosis module 36 may reside within router control unit 12. Alternatively, diagnosis module 36 may reside with a router management client that communicates with router control unit 12 via CLI 34. FIG. 2 depicts an embodiment in which diagnosis module resides within router control unit. An alternative arrangement will be described with reference to FIG. 3 below. As shown in FIG. 2, diagnosis module 36 can be responsive to commands received from human users or script clients via CLI 34. A client submits a command via CLI module 34 requesting fault condition information.

In either case, diagnosis module 36 submits an XML-formatted command to management server module 32, which then interrogates the appropriate software module or system resource or component for information corresponding to the pertinent XML tags. Diagnosis module 36 then parses output according to criteria specified in the command, such as the level of detail requested, and the particular router components about which information is requested. In this manner, diagnosis module 36 may be used to diagnose specific conditions and record its diagnosis in a specific, targeted log that is easier to analyze than the conventional time-based system log. Diagnosis module 36 may render the XML tags to a variety of different documents and formats for analysis by network administrators. Further, diagnosis module 36 may be configured to parse the targeted log automatically and contact a network administrator or other user using, for example, electronic mail, facsimile, or pager communications when a fault condition exceeds a specified threshold or when a certain type of fault occurs.

In some embodiments, the diagnostic information obtained in response to a request can be used to determine whether additional information relating to other router components should be obtained. For example, a fault condition or some other indication provided by a router component may suggest the possibility of fault conditions with other router components. A rule base 40 may be applied by diagnosis module 36 in order to obtain enough information to make an accurate diagnosis. Rule base 40 may drive collection of a chain of different informational items from various router components, such as chassis module 26, device configuration module 28 and routing protocol module 30, until sufficient information is available to make a fault diagnosis with greater confidence.

Following an initial set of XML requests generated by diagnosis module 36, and based on an initial set of XML replies returned by management server module 32, diagnosis module 36 may consult rule base 40 to formulate additional XML requests in an effort to isolate a problem in the router. The contents of rule base 40 also may be consulted by a human user or automatically by a fault diagnosis script. As an example, if chassis module 26 reports an inactive link following an XML request for information from the chassis module, rule base 40 may drive diagnosis module 36 to transmit one or more additional XML requests to isolate the source of the problem. For example, diagnosis module 36 may request from chassis module 26 information concerning temperature, hard drive status, power status or the like for a particular IFC 18 associated with the inactive link.

Figure 3:
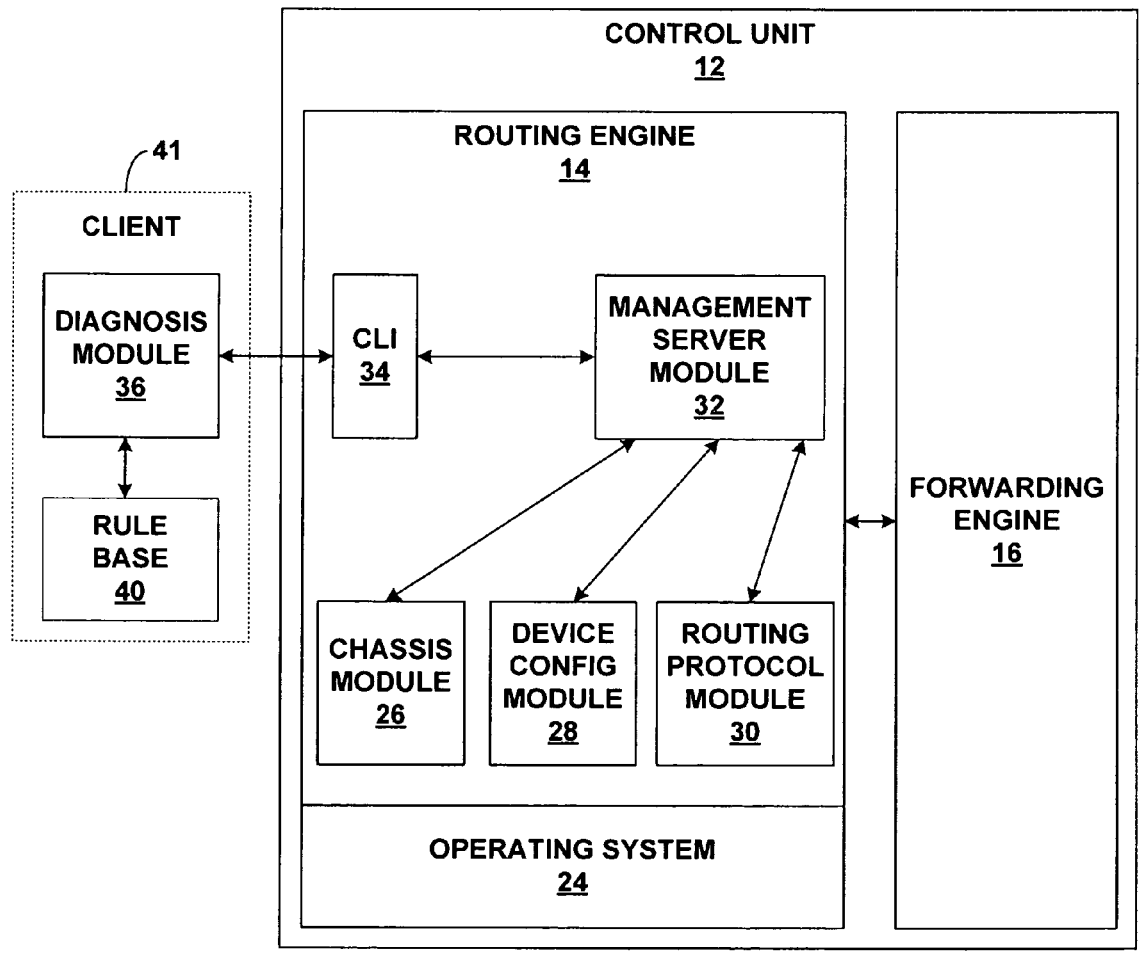
FIG. 3 is a block diagram illustrating another example control unit consistent with the principles of the invention.

FIG. 3 is a block diagram illustrating another example control unit 12 consistent with the principles of the invention. Control unit 12 of FIG. 3 conforms substantially to the embodiment of FIG. 2. In the embodiment of FIG. 3, however, diagnosis module 36 resides with a router management client 41 that may be situated remotely from control unit 12. Diagnosis module 36 sends queries to CLI module 34 for handling by management server module 32. Again, the queries may take the form of XML requests. In this case, the command line interface provided by CLI 34 may present an XML-based API to router management client 41.

Management server module 32 receives the incoming XML queries via CLI 34 and services them based on the XML-based API. As will be described, for example, management server module 32 may access an XML schema or date type definition (DTD) to transmit requests to particular router components, such as chassis module 26, device configuration module 28, and routing protocol module 30. In response, the components may transmit XML tags or ASCII replies that are targeted more specifically to the information requested. Thus, in this case, management server module 32 requests diagnostic information directly from the various router modules, which preferably store the diagnostic information using XML tags.

Again, the diagnostic information may include the type of fault condition encountered, the time at which the router encountered the fault condition, and the number of times the router encounters particular types of fault conditions, as well as specific parametric information or measurements associated with the components. Implementation of diagnosis module 36 within a router management client 41 may permit more customized diagnosis for respective network service providers. For example, some types of information may be very important to one network service provider, but irrelevant to another network service provider. Accordingly, placement of diagnosis module 36 within router management client 41 permits individual network service providers to more effectively tailor the XML requests to their needs. In addition, the network service providers may exert greater control over the particular information that is rendered for diagnostic purposes by formulating their own XML requests at router management client 41.

Diagnosis module 36 also may be equipped to provide customized rendering of XML replies from router 10. For example, diagnosis module 36 may present a web browser interface that renders XML tags into a format that is organized according to the requirements of the network service provider. Diagnosis module 36 also may used CGI (common gateway interface) scripts in conjunction with a web browser application to generate XML requests and render XML replies into documents, databases, and the like. For example, a network administrator may simply click on hypertext links to cause router management client 41 to transmit one or more XML requests to CLI 34.

In addition, diagnosis module 36 may apply XSLT transformations to intelligently filter XML replies for information that is most meaningful to the network administrator. The XSLT transformation can be especially useful in prioritizing a list of router component information for use in diagnostics. In this manner, XML and related technologies can be exploited to promote efficiency in diagnostic information gathering and improve relevance of the rendered information.

Figure 4:
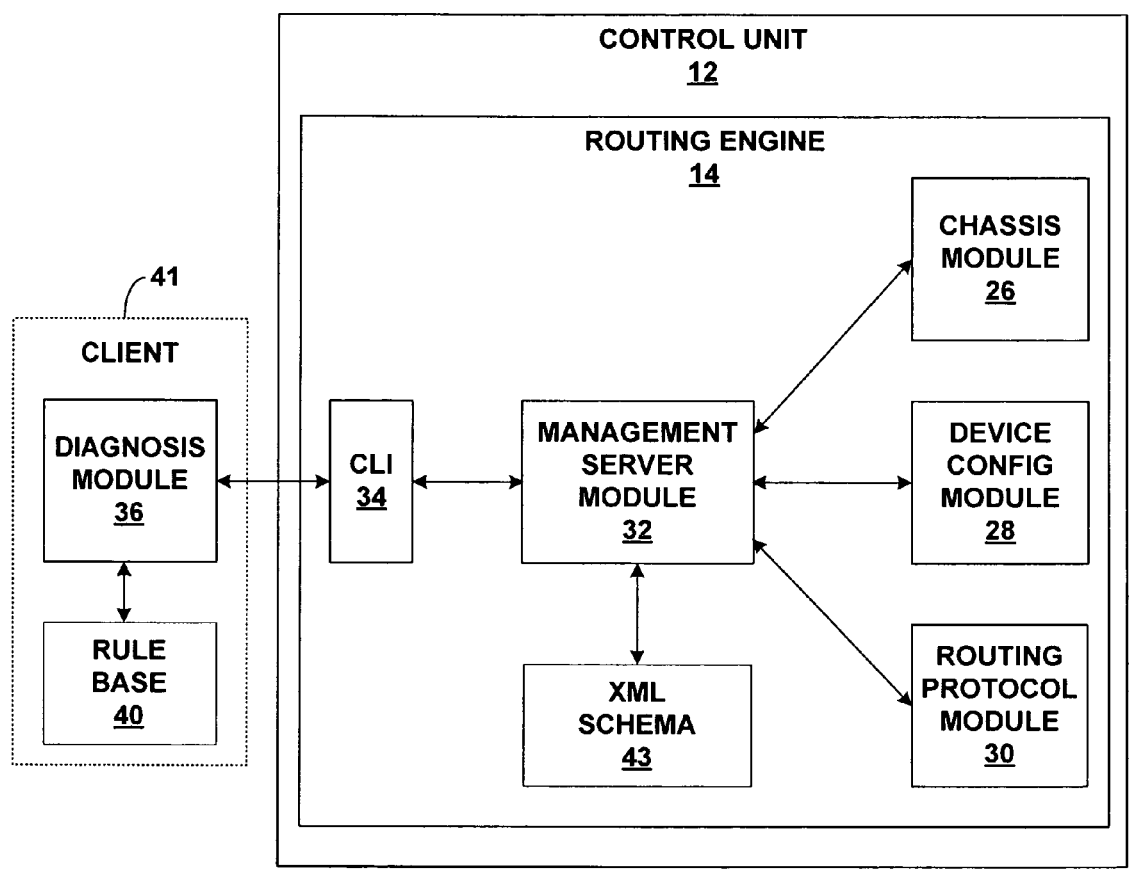
FIG. 4 is a block diagram illustrating a system configured to diagnose router fault conditions using an XML schema.

FIG. 4 is a block diagram illustrating a system configured to diagnose router fault conditions using an XML schema. In particular, FIG. 4 depicts routing engine 14 substantially as shown in FIGS. 2 and 3. In the example of FIG. 4, however, management server module 32 consults an XML schema 43 upon receipt of XML requests from router management client 41. Using XML schema, management server module 32 maps the XML tags with the requests to particular router components and information maintained by those components. Although the use of XML schema 43 is shown in FIG. 4, management server module 32 alternatively could make use of a data type definition (DTD) document that defines a similar relationship. In either case, management server module 32 retrieves the particular information requested by client 41, and thereby produces a more targeted body of information for diagnostic purposes.

Figure 5:
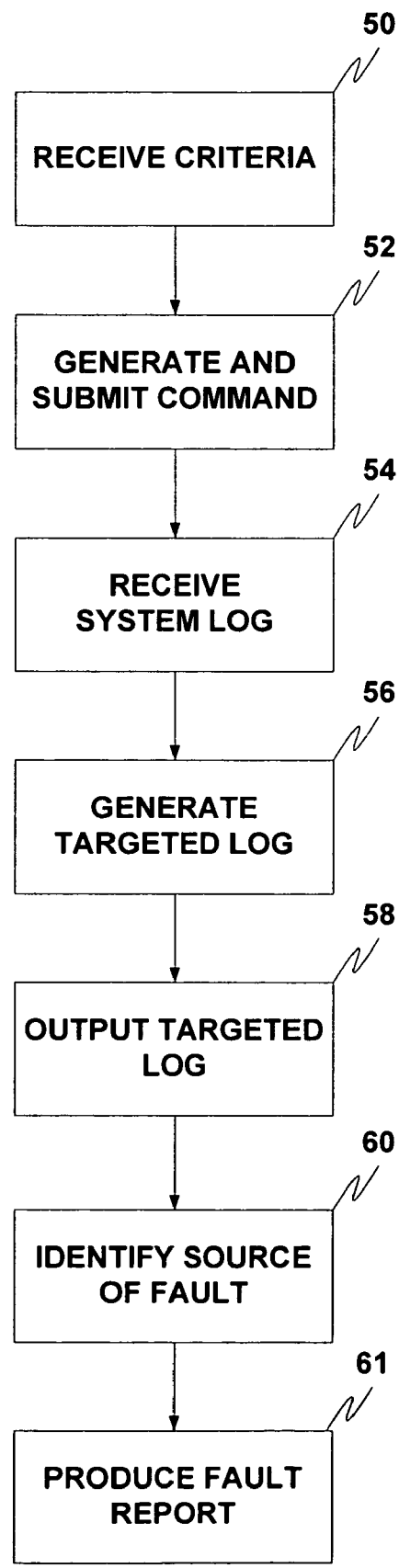
FIG. 5 is a flow diagram illustrating a mode of operation consistent with the principles of the invention.

FIG. 5 is a flow diagram illustrating an example mode of operation of diagnosis module 36 to extract specific router events from a system log, consistent with an embodiment of the invention. As shown in FIG. 5, diagnosis module 36 receives user input that specifies criteria relating to the diagnostic information requested (50), such as the amount and type of information in which the user is interested. An administrator or other user may specify these criteria, for example, using a command line interface (CLI). Based on the received user input, diagnosis module 36 generates a "diagnose" command and submits the command to management server module 32 (52). Diagnosis module 36 may use a script client to convert the CLI command to an XML-tagged format. The "diagnose" command may result in transmission of one or more XML tags that specify particular router components about which information is requested, as specified by the user-selected criteria.

By way of example, to obtain information about the interfaces on router 10, diagnosis module 36 could transmit the following request in XML-tagged format:

```
<rpc>
<get-interface-information>
    <statistics/>
</get-interface-information>
</rpc>
```

If the user wishes to obtain fault information relating to a particular Fast Ethernet interface, diagnosis module 36 might send a request with the following tagged format:

```
<rpc>
<get-interface-information>
    <interface>fe-0/0/0</interface>
</get-interface-information>
</rpc>
```

The user may also be able to specify the level of detail with which fault information should be returned. For example, if only the fault conditions are to be returned, diagnosis module 36 may transmit a request according to the following tagged format:

```
<rpc>
<get-interface-information>
    <terse>
        <interface>fe-0/0/0</interface>
    </terse>
</get-interface-information>
</rpc>
```

On the other hand, if the user is interested not only in the fault conditions themselves, but also in the times and rates at which the fault conditions occur, the user might instead enter the CLI command "diagnose detail interface fe-0/0/0," which might be converted to the tagged format:

```
<rpc>
<get-interface-information>
    <detail/>
        <interface>fe-0/0/0</interface>
    </detail>
</get-interface-information>
</rpc>
```

In each case, the XML tags serve as qualifiers limiting the scope of information presented to the user, making the information significantly more understandable.

In some embodiments, instead of requesting and receiving specific XML tags, diagnosis module 36 may receive the entire system log or a portion of the system log from management server module 32 in response to the command (54) and filters the system log based on the XML tags (56), generating a targeted log that is more focused on the component or components of interest to the user. Diagnosis module 36 returns the targeted log to the user (58). As mentioned above, the information in the log may be rendered into a variety of documents and forms for presentation to the network administrator. The content of the targeted log is dependent on the XML tags included in the command, i.e., the XML requests. As a particular example, if the "command does not contain any XML tags, diagnosis module 36 may return fault information for all components in the router. By contrast, if the "diagnose" command contains an XML tag "<interface>fe-0/0/0</interface>" that identifies a particular interface, diagnosis module 36 returns only the fault information pertaining to that interface. As described above, other tags "<detail>" and "<terse>" may specify the level of detail of the returned information.

In some embodiments, as discussed above, diagnosis module 36 may apply a rule base (40 of FIG. 2) to the targeted log to deduce the source of a fault condition (60) and produce a fault report (61). In identifying the source of a fault, diagnosis module 36 may generate additional commands to request fault information for another router component. Further, diagnosis module 36 may use the fault information that it obtains for the second router component to determine whether diagnosis module 36 should generate additional commands to request information from a third router component. More generally, diagnosis module 36 may use information obtained for one or more router components to determine whether to request information relating to another router component. Diagnosis module 36 may repeat this process until it has accumulated enough information to arrive at a diagnosis as to the source of a problem with an acceptable degree of certainty. When diagnosis module 36 outputs the targeted log, it may characterize the likelihood that the diagnosis is correct.

Figure 6:
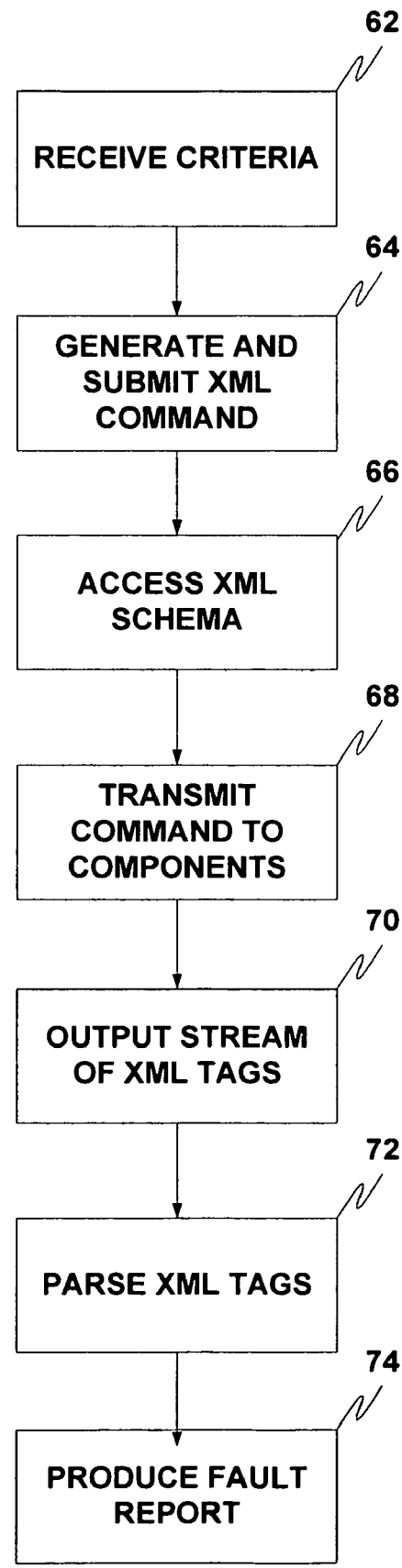
FIG. 6 is a flow diagram illustrating an alternative mode of operation consistent with the principles of the invention.

FIG. 6 is a flow diagram illustrating an example mode of operation of diagnosis module 36 to request specific information from router 10 in accordance with an embodiment of the invention. As shown in FIG. 6, diagnosis module 36 receives user input that specifies criteria relating to the diagnostic information requested (62), such as the amount and type of information in which the user is interested. Diagnosis module 36 generates and submits an XML command (64), i.e., an XML request containing XML tags corresponding to the information requested by the user. Management server module 32 receives the XML request via CLI 34, and maps the XML tags to components within router 10 by accessing XML schema 43 (66).

Using the schema 43, management server module 32 transmits the appropriate requests to the individual components (68), e.g., chassis module 26, device configuration module 28, and routing protocol module 30. The individual components emit XML replies to management server module 32, which then outputs the replies to router management client 41 as a stream of XML tags (70). As an alternative, some of the components may emit replies in other formats such as ASCII. In this case, management server module 32 may wrap the ASCII in XML tags. In either cases, the XML tags are parsed (72) and rendered by diagnosis module 36 on router management client 41 to produce a fault report (74) or some other useful document or database record.

Figure 7:
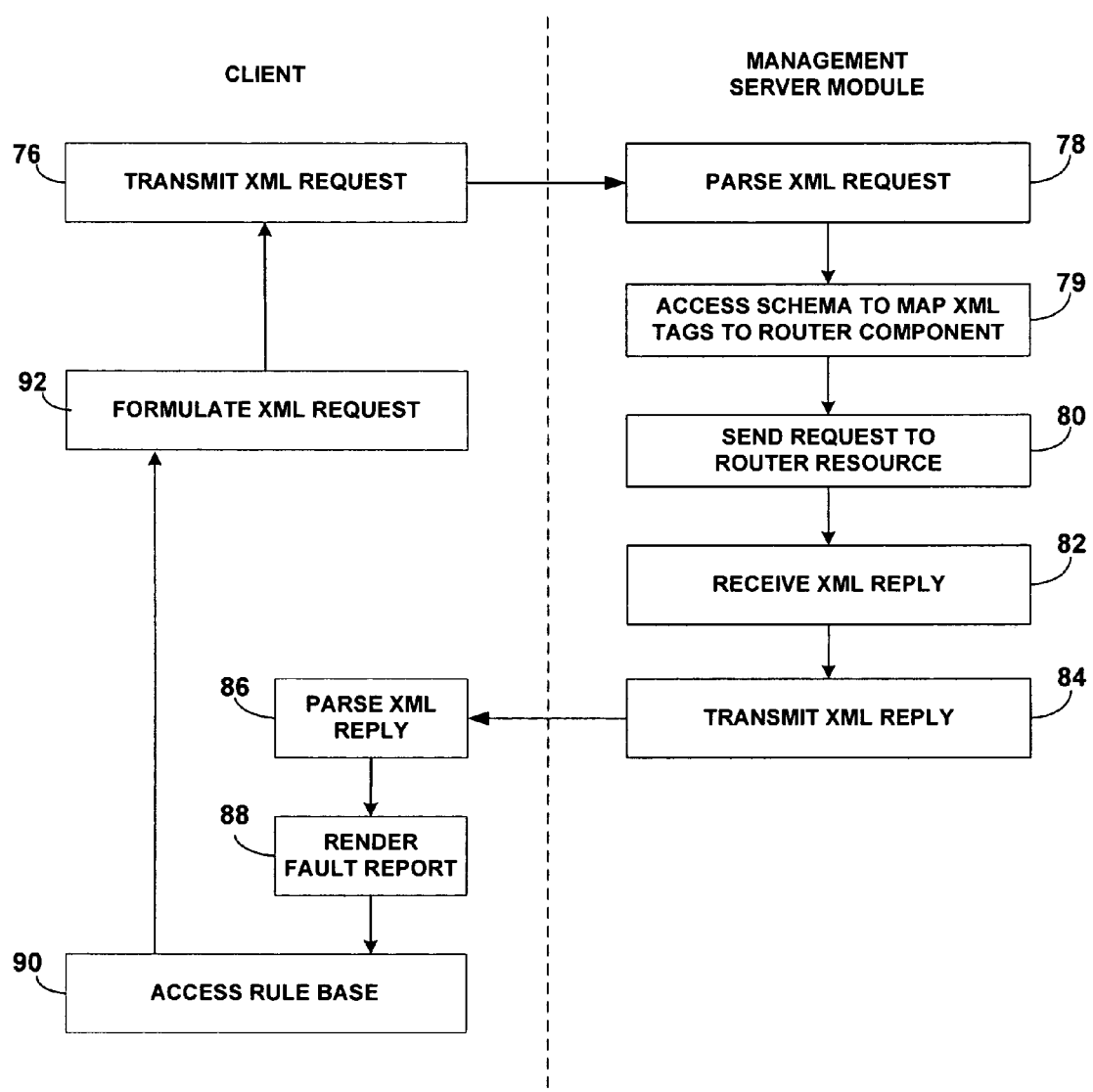
FIG. 7 is a flow diagram illustrating interaction between a client and a management server on a network device such as a router.

FIG. 7 is a flow diagram illustrating interaction between a client and a management server on a network router. As shown in FIG. 7, to obtain diagnostic information, router management client 41 transmits an XML request (76) to management server module 32 via CLI 34. Management server module 32 parses the XML request (78) and accesses XML schema 43 to map the XML tags to particular router components (79). Management server module 32 then sends XML requests to one or more respective router components (80). Upon recent of XML replies (82), management server module 36 transmits the replies to router management client 41 (84). Router management client 41 then parses the XML reply (86) and renders the reply to generate a fault report (88), e.g., in a variety of forms such as web pages, word processing documents, spreadsheets, database entries, email message notifications and the like. In addition, router management client 41 may access rule base 40 (90) to formulate and transmit another XML request (92, 76). In this manner, rule base 40 may be used to transmit a series of XML requests designed to identify a root cause of a fault condition.

Router 4 and router management client 41 may include, or be used in conjunction with, some form of computer-readable media. By way of example, and not limitation, computer readable media may comprise computer storage media and/or communication media. Computer storage media includes volatile and nonvolatile, removable and nonremovable media implemented in any method or technology for storage of information such as processor-readable instructions, data structures, program modules, or other data. Computer storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by router 4 or router management client 41. Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

A number of implementations and embodiments of the invention have been described. Nevertheless, it is understood that various modifications can be made without departing from the spirit and scope of the invention. For example, while some embodiments have been described using the specific example of XML tagged output, the invention is not limited to use with this particular format. Furthermore, although the functionality has been described in reference to a central control unit of a network device, e.g., control unit 12 of router 10, the functionality may be distributed to the interface cards or other components of the network device, e.g., IFCs 18. Accordingly, these and other embodiments are within the scope of the following claims.

The invention claimed is:
1. A method comprising:
receiving, with a client device, a diagnose command that specifies a selection criteria using extensible markup language tags;
sending a request for information from the client device to a network device to retrieve a system log that contains information relating to a plurality of network device events for a plurality of different components of the network device;
generating, with the client device, an abridged system log from the system log by extracting information from the system log based on the selection criteria; and
presenting the abridged system log to a user with the client device.
2. The method of claim 1, wherein the selection criteria identifies at least one of the components of the network device about which information is requested by the client device.
3. The method of claim 1, wherein the selection criteria specifies a level of detail of the requested information.

4. The method of claim 1, wherein the extensible markup language is XML.

5. The method of claim 1, further comprising generating the extensible markup language tags based on input received using a command line interface (CLI).

6. The method of claim 1, further comprising:

applying one or more rules with a diagnosis module within the client device to repeatedly and automatically generate one or more subsequent requests for additional information from the network device relating to a fault condition from one or more different components of the network device until a source of the fault condition can be identified to a threshold degree of certainty;

receiving one or more subsequent replies that include additional information relating to the fault condition; and presenting the received information relating to the fault condition to the user.

7. The method of claim 6, wherein the fault condition comprises at least one of flapping, dropped packets, component failures, inactive interface cards, or abnormal environmental conditions of the network device.

8. The method of claim 6, wherein the subsequent requests are automatically generated to include at least one user-specified criterion that identifies the component from which the information is to be received.

9. The method of claim 8, further comprising presenting the information with a level of detail determined by the at least one user-specified criterion.

10. The method of claim 1, wherein the extensible markup language tags are defined by one or more data type definition (DTD) files.

11. The method of claim 1, wherein the extensible markup language tags are defined by one or more XML Schema Language files.

12. A client machine comprising:

a physical interface for communicating with a network;

a programmable processor configured for:

presenting an interface supporting input by which a user initiates remote diagnostics of a network device, wherein the input includes at least one user-specified criterion, in response to the input, automatically formatting one or more commands using extensible markup language tags and sending the commands from the client machine to the network device to retrieve a system log that contains information relating to a plurality of network device events for a plurality of different components of the network device, and extracting the information from the system log and producing an abridged system log for presentment to the user.

13. The client machine of claim 12, wherein the programmable processor is further configured for repeatedly and automatically formatting commands and sending one or more subsequent requests for additional information from the network device relating to a fault condition from one or more different components of the network device until a source of the fault condition can be identified to a threshold degree of certainty.

* * * * *